United States Patent Office 3,663,540
Patented May 16, 1972

---

3,663,540
7 - (p-AMINOMETHYLPHENYLTHIO)ACETAMIDO-3 - (PYRIDINIUMMETHYL)CEPH - 3 - EM - 4-CARBOXYLATE
Raymond Urgel Lemieux and Rintje Raap, Edmonton, Alberta, Canada, assignors to R & L Molecular Research Ltd., Edmonton, Alberta, Canada
No Drawing. Filed June 19, 1970, Ser. No. 47,915
Int. Cl. C07d 99/24
U.S. Cl. 260—243 C          4 Claims

ABSTRACT OF THE DISCLOSURE

7 - (p - aminomethylphenylthio)acetamido-3-(pyridiniummethyl)ceph-3-em-4-carboxylate and its nontoxic, pharmaceutically acceptable salts are valuable as antibacterial agents, as nutritional supplements in animal feeds and as therapeutic agents in poultry and animals, including man, and are especially useful in the treatment of infectious diseases caused by many gram-positive and gram-negative bacteria. 7 - (p - aminomethylphenylthio)-acetamido - 3 - (pyridiniummethyl)ceph - 3 - em - 4-carboxylate is prepared, for example by treatment at 0° C. with trifluoroacetic acid of the corresponding compound in which the free amino group is protected with a tert.-butoxycarbonyl group.

BACKGROUND OF THE INVENTION

(1) Field of the invention

The cephalosporin of the present invention possesses the usual attributes of such compounds and is particularly useful in the treatment of bacterial infections by virtue of its potent activity and ease of absorption upon parenteral administration.

(2) Description of the prior art

Sodium cephalothin is a well-known antibacterial agent which has been widely used in medicine by injection. Many other 7-acyl derivatives of 7-aminocephalosporanic acid have been reported in the patent literature including 7-(p-aminomethylphenylacetamido)cephalosporanic acid (U.S. Pat. 3,382,241), 7-(α-aminophenylacetamido)cephalosporanic acid (Great Britain 985,747 and 1,054,806, and Example 1 of U.S. Pat. 3,363,212, widely known as cephaloglycin), 7 - [(p - aminophenylthio)acetamido] cephalosporanic acid (U.S. Pat. 3,422,100), 7-(halophenylthioacetamido)cephalosporanic acids (U.S. Pat. 3,335,136) and the nearly unlimited number of variations of such compounds encompassed by the generic formulae (and often not otherwise described) of such patents as Netherlands 6902013 (Farmdoc 39172). 7 (p-aminophenylacetamido)-cephalosporanic acid is also disclosed in U.S. Pat. 3,422,103 as is the corresponding N-trityl derivative; see also Japan 2,712/67 (Farmdoc 25406).

In cephaloridine the 3-acetoxy group of cephalothin was replaced by a pyridinium group as described, for example, in U.S. Pats. 3,449,338 and 3,498,979.

SUMMARY OF THE INVENTION

This invention comprises the amphoteric compound of the formula

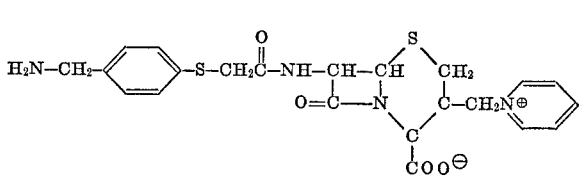

which exists primarily as the zwitterion, and its nontoxic, pharmaceutically acceptable acid addition salts.

Such salts include mineral acid addition salts such as the hydrochloride, hydrobromide, hydroiodide, sulfate, sulfamate and phosphate and organic acid addition salts such as the maleate, acetate, citrate, oxalate, succinate, benzoate, tartrate, fumarate, malate, mandelate, ascorbate, trifluoroacetate and the like.

The compound of the present invention is prepared by coupling with 7-aminocephalosporanic acid (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. Said acid has the formula

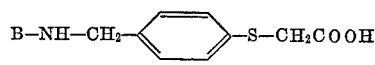

wherein B represents a blocking group of the type used either in peptide syntheses or in any of the numerous syntheses of α-aminobenzylpenicillin from 2-phenylglycine. Particularly valuable blocking groups are a proton, as in the compound of the formula

or a β-diketone as in Great Britain 1,123,333, e.g. methyl acetoacetate, in which case the acid containing the blocked amino group is preferably converted to a mixed anhydride, as with ethyl chloroformate, before reaction with 7-aminocephalosporanic acid or a salt thereof to form 7-[(p - aminomethylphenylthio)acetamido]cephalosporanic acid with the amino group blocked.

The 3-acetoxy group is then replaced by the 3-pyridiniummethyl group by the use of a procedure described by Glaxo Laboratories Ltd. in Netherlands Pat. 6,408,066. Thus when the blocking group is tert.-butoxycarbonyl the acetoxy group in potassium 7-[[p-(tert.-butoxycarbonylaminomethyl)phenylthio]acetamido]cephalosporanate is first replaced with thiopicolinic acid which is in turn replaced by pyridine by reaction with a mercuric perchlorate-pyridine complex.

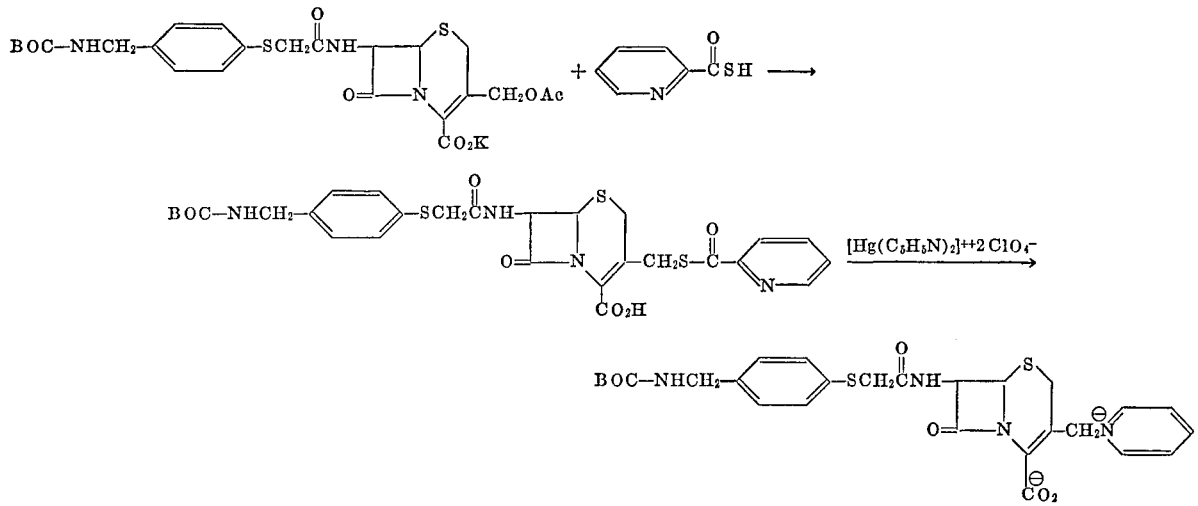

Further to the discussion above of blocking groups used on the free amino group of the side-chain acid during its coupling with 7-aminocephalosporanic acid, the blocking group is then removed to form the products of the present invention, e.g. the t-butoxy-carbonyl group is removed by treatment with formic acid or trifluoroacetic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with 7-aminocephalosporanic acid, functional equivalents include the corresponding acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI, 6, 360 (1965)] or by the use of enzymes or of an N,N'-carbonyldiimidazole or an N,N'-carbonylditriazole [cf. South African patent specification 63/2684 or a carbodiimide reagent, especially N,N'-dicyclohexylcarbodiimide, N,N'-diisopropylcarbodiimide or N-cyclohexyl-N'-(2-morpholinoethyl)-carbodiimide; cf. Sheehan and Hess, J. Amer. Chem. Soc. 77, 1067 (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amide nitrogen is a member of a quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolite. The by-product, imidazole, precipitates and may be separated and the imidazolide isolated, but this is not essential. The methods for carrying out these reactions to produce a cephalosporin and the methods used to isolate the cephalosporin so-produced are well-known in the art.

7 - (p - aminomethylphenylthio)acetamido-3-(pyridiniummethyl)ceph-3-em-4-carboxylate, which is soluble in water to the extent of at least 2 mgm./ml., in Nutrient Broth was found in duplicate experiments to exhibit the following Minimum Inhibitory Concentrations (M.I.C.) in mcg./ml. versus the indicated microorganisms as determined by overnight incubation at 37° C. by Tube Dilution.

| Organism | M.I.C. in mcg./ml., Run Number | |
|---|---|---|
| | 1 | 2 |
| D. pneumoniae | <.02 | .004 |
| St. pyogenes | <.02 | .004 |
| S. aureus, Smith | .04 | .04 |
| S. aureus, Smith, 50% serum | .08 | .04 |
| S. aureus, BX-1633-2 | .5 | .6 |
| Sal. enteritidis | <.5 | .6 |
| E. coli, Juhl (A15119) | 1 | 1 |
| E. coli | 1 | 1 |
| K. pneumoniae | 1 | 1 |
| K. pneumoniae | 2 | 2 |
| Pr. mirabilis | 1 | 1 |
| Pr. morganii | 125 | 63 |
| Ps. aeruginosa | 250 | 250 |
| Ser. marcescens | 63 | 63 |

7-(p-aminomethylphenylthio)acetamido-3-(pyridiniummethyl)ceph-3-em-4-carboxylate was generally considerably more potent in such tests than sodium cephalthin and about as potent as cephaloridine. Another test also indicated that 7-[α-(p-aminomethylphenylthio)acetamido]-3-(pyridiniummethyl)ceph - 3 - em-4-carboxylate was not significantly bound to human serum. There are preliminary indications that 7 - [α - (p - aminomethylphenylthio)-acetamido] - 3 - (pyridiniummethyl)ceph - 3-em-4-carboxylate will exhibit less nephrotoxicity than cephaloridine (which will permit higher dosage in man when needed) while retaining equal or greater antibacterial potence and breadth of spectrum.

7-(p-aminomethylphenylthio)acetamido-3-(pyridiniummethyl)ceph - 3 - em - 4 - carboxylate was well absorbed in mice upon parenteral, but not oral, administration. Blood levels in mice after intramuscular administration of 10 mgm./kg. were higher than those obtained with cephalothin and about equal to those obtained with cephaloridine. A lower minimum dose ($CD_{50}$) of 7-[(p-aminomethylphenylthio)acetamido] - 3 - (pyridiniummethyl)ceph-3-em-4-carboxylate than of cephalothin was required by subcutaneous administration in two doses to cure 50% of groups of mice infected by *Str. pyogenes* (A9604) or *E. coli* Juhl (A15119).

In the treatment of bacterial infections in man, the compounds of this invention are administered parenterally, in accordance with conventional procedures for antibiotic administration, in an amount of from about 5 to 200 mg./kg./day and preferably about 5–20 mg./kg./day in divided dosage, e.g., three to four times a day. They are administered in dosage units containing, for example, 125, or 250 or 500 mg. of active ingredient with suitable physiologically acceptable carriers or excipients. The dosage units are in the form of liquid preparations such as solutions or suspensions.

The following examples are given in illustration of, but not in limitation of, the present invention. All temperatures are in degrees centigrade. "Hour" and "hours" are abbreviated as "h."

METHODS OF PREPARING STARTING MATERIAL

7 - [(p - aminomethylphenylthio)acetamido]cephalosporanic acids with various blocking groups are prepared as follows:

METHOD 1

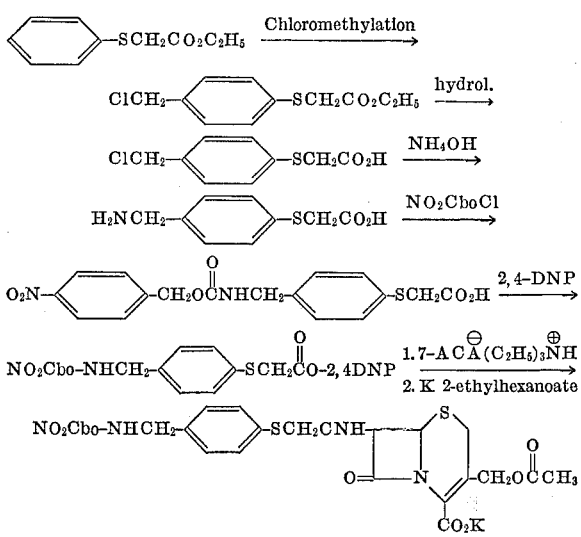

Ethyl(p-chloromethylphenylthio)acetate

A rapid stream of dry hydrogen chloride was passed through a stirred mixture of ethyl(phenylthio)acetate (55.4 g., 0.28 mole), paraformaldehyde (12.0 g., 0.133 mole), anhydrous zinc chloride (5 g.) and chloroform (150 ml.) at room temperature until the mixture was saturated (after approximately 1 h.). The mixture was stirred for an additional 1 h. at room temperature and 1.5 h. at 40°, then poured into 400 ml. ice-water. The layers were separated and the aqueous layer extracted with an additional 100 ml. of chloroform. The combined chloroform solutions were dried (MgSO$_4$), the solvent removed and the residue fractionally distilled in vacuo to give 21.1 g. (31%) of the desired product, B.P. 140–150° (0.2 mm.); n.m.r. (CCl$_4$): $\tau$ 2.72 (s., 4H), 5.53 (s., 2H), 5.91 (q., 2H), 6.49 (s., 2H) and 8.80 (t., 3H). The infrared spectrum contained a strong band at 1730 cm.$^{-1}$ ascribed to the ester carbonyl.

(p-chloromethylphenylthio)acetic acid

A mixture of ethyl (p-chloromethylphenylthio)acetate (24.5 g., 0.10 mole), acetic acid (320 ml.) and 6 N hydrochloric acid (125 ml.) was left at room temperature for 16 h., then concentrated under reduced pressure to a small volume. The white solid was collected by filtration, washed with ice-water, dried and recrystallized from a 1:1 benzene-n-hexane mixture to give 10.5 g. (49%) of solid (p-chloromethylphenylthio)acetic acid, M.P. 95–103°;

$\nu_{max.}^{Nujol}$ 1700 cm.$^{-1}$; n.m.r. (CDCl$_3$): singlets at $\tau$ −0.98 (1H) 2.65 (4H), 5.48 (2H) and 6.35 (2H)

(p-aminomethylphenylthio)acetic acid (p-chloromethylphenylthio)acetic acid (11.5 g., 0.053 mole) was added in portions with stirring to 150 ml. of concentrated ammonium hydroxide at room temperature. The solution was left at room temperature for 17 h., then concentrated to dryness. The residue was treated with 100 ml. of methanol. The white solid was collected by filtration and dried in vacuo over P$_2$O$_5$: 5.8 g. of (p-aminomethylphenylthio)acetic acid (55%), M.P. 203–205° (dec.); n.m.r. (CF$_3$CO$_2$H):$\tau$ 2.51 (s., 4H), 5.59 (q., 2H) and 6.16 (s., 2H).

[p-(p'-Nitrocarbobenzoxyaminomethyl)phenylthio]acetic acid

To a stirred suspension of (p-aminomethylphenylthio) acetic acid (4.53 g., 0.023 mole) in 120 ml. of water was added 1 N aqueous sodium hydroxide until the solution had attained pH 10. The clear solution was diluted with 80 ml. of THF (tetrahydrofuran). Next a solution of p-nitrobenzyl chloroformate (NO$_2$CboCl) (5.60 g., 0.026 mole) was added dropwise with stirring at room temperature in approximately 15 minutes. By the simultaneous addition of 1 N aqueous sodium hydroxide the pH was controlled at 7–9. When the addition was completed the solution was extracted with two 100 ml. portions of ethyl acetate. The aqueous solution was cooled and acidified with 20 ml. of 3 N aqueous sulfuric acid. The precipitated oil was extracted with ethyl acetate (2× 100 ml.). After drying (MgSO$_4$), the ethyl acetate solution was concentrated to a volume of 50 ml. and cooled to give 5.4 g. (63%) of white, solid [p-(p'-nitrocarbobenzoxyaminomethyl)phenylthio]acetic acid, M.P. 143–147°. The structure of the compound was confirmed by the infrared spectrum.

Potassium 7-{[p-(p'-nitrocarbobenzoxyaminomethyl) phenylthio]acetamido}cephalosporanate N,N'-dicyclohexylcarbodiimide (1.03 g., 0.0050 mole) (DCC) was added to a cold solution of [p-(p'-nitrocarbobenzoxyaminomethyl)phenylthio]acetic acid (1.88 g., 0.0050 mole) and 2,4-dinitrophenol (0.92 g., 0.005 mole) (2,4-DNP) in 10 ml. of anhydrous THF. The mixture was left at room temperature for 1 h., then the N,N'-dicyclohexylurea was filtered off and the filtrate containing the crude activated ester was concentrated to dryness under reduced pressure. A solution of 7-aminocephalosporanic acid (1.36 g., 0.0050 mole) (7–ACA) and triethylamine (1.01 g., 0.010 mole) in 10 ml. of methylene chloride was added to the residue consisting of the crude activated ester cooled at 0°. The reaction mixture was left at room temperature for 4.5 h., then the solution was diluted with ester. The oily precipitate was twice redissolved in methylene chloride and reprecipitated with ether, then dissolved in methanol (15 ml.). The methanol solution was treated with 2.5 ml. of a 2.3 M solution of potassium 2-ethylhexanoate in n-butyl alcohol, followed by the addition of ether. The solid precipitate was filtered off and suspended in 30 ml. of methanol (only part of it dissolved). After the addition of ether the product was collected by filtration and dried to give 3.0 g. (90%) of yellow-colored, solid potassium 7-[p-(p'-nitrocarbobenzoxyaminomethyl)phenylthio]acetamido cephalosporanate. The infrared spectrum (Nujol mull) contained the expected bands at 3250, 1760, 1725, 1690, 1655 and 1600 cm.$^{-1}$.

METHOD 2

Cephalosporin from (p-aminomethylphenylthio)acetic acid (p-Aminomethylphenylthio)acetic acid is available by amidomethylation (H. E. Zaugg and W. B. Martin, Organic Reactions, vol. 14, John Wiley & Sons, Inc., New York, chapter 2 (1965)) of (phenylthio)-acetic acid followed by hydrolysis, e.g.:

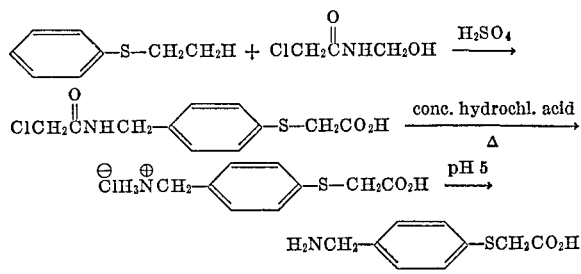

The use of the tert.-butoxycarbonyl (BOC) group as protective group was investigated for 7-[(p-aminomethylphenylthio)acetamido]cephalosporanic acid and found to be very successful and its use in recommended over the p-nitrocarbobenzoxy group.

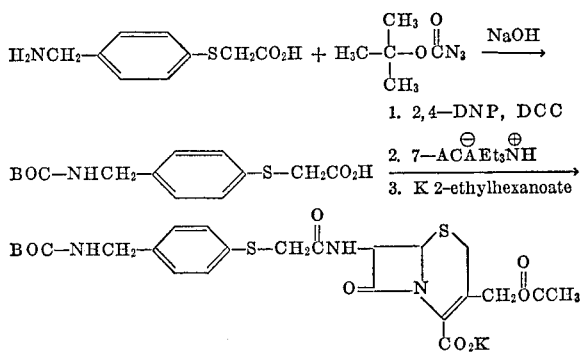

(p-Aminomethylphenylthio)acetic acid

A mixture of (phenylthio)acetic acid (232.6 g., 1.38 mole) and N-methylolchloroacetamide (172.9 g., 1.40 mole) was added in portions in one h. with stirring to 375 ml. of concentrated sulfuric acid at 10–20°. The reaction mixture was left at room temperature for 5 days and was then poured into 3 l. of a mixture of ice and water with vigorous stirring. The product was extracted with ethyl acetate (one 600 ml. portion and two 200 ml. portions). The combined ethyl acetate solutions were extracted with a total of 700 ml. of 2 N aqueous sodium carbonate. The carbonate extract was cooled and acidified with 250 ml. 6 N hydrochloric acid, followed by extraction with ethyl acetate. The ethyl acetate solution was dried (MgSO₄) and concentrated to a volume of approximately 500 ml., followed by cooling at 0° overnight. The white solid (241.4 g., M.P. 85–108°) was collected by filtration, washed with ether and heated under reflux with 1 l. of concentrated hydrochloric acid for 2.5 h. The white hydrochloride which precipitated upon cooling was gathered by filtration and dissolved in 1 l. of warm water. The pH of this solution was adjusted to 5.0 with concentrated ammonium hydroxide. The amino acid, which readily crystallized from the solution, was collected by filtration after cooling. The white solid (p-aminomethylphenylthio) acetic acid was washed with ice-water and methanol and then dried in vacuo over $P_2O_5$: 45.6 g. (17%), M.P. 249–251° (decomp.). The material was identical with that obtained by treatment of (p-chloromethylphenylthio)acetic acid with ammonium hydroxide.

[p-(Tert.-butoxycarbonylaminomethyl)phenylthio] acetic acid

A solution of tert.-butoxycarbonyl azide (6.2 g., 0.043 mole) in 60 ml. of THF was added to an ice-cooled solution of (p-aminomethylphenylthio)acetic acid (6.9 g., 0.035 mole) in 80 ml. of 1 N aqueous sodium hydroxide. The reaction mixture was stirred at room temperature for 18 h. Some starting amino acid had precipitated and was removed by filtration. Most of the THF was removed under reduced pressure. The aqueous solution was washed once with ether, then layered with 100 ml. of ether, and under ice-cooling and stirring, adjusted to pH 3.5 with dilute hydrochloric acid. At this stage some more starting amino acid precipitated and was removed by filtration (a total of 0.9 g. of amino acid was recovered). The layers were separated and the aqueous layer extracted with an additional 75 ml. of ether. The combined ether layers were dried and then concentrated to dryness. The solid residue was washed with 75 ml. of cold n-hexane to give 7.0 g. (68%) of white, solid [p-(tert.-butoxycarbonylaminomethyl)phenylthio]acetic acid, M.P. 114–115°. The infrared spectrum (Nujol mull) contained the expected maxima at 3350, 1700 and 1680 cm.$^{-1}$.

Potassium 7-{[p-(tert.-butoxycarbonylaminomethyl)phenylthio]acetamido}cephalosporanate N,N′-dicyclohexylcarbodiimide (2.47 g., 0.012 mole) was added to a solution of the BOC-amino acid, [p-(tert.-butoxycarbonylaminomethyl)phenylthio]acetic acid (3.56 g., 0.012 mole), and 2,4-dinitrophenol (2.21 g., 0.012 mole) in 30 ml. of THF. After 1 h. at room temperature the mixture was filtered and the solvent removed from the filtrate. The residual yellow oil was dissolved in 10 ml. of methylene chloride and, under ice-cooling, a solution of 7-aminocephalosporanic acid (3.26 g., 0.012 mole) and triethylamine (3.0 g., 0.03 mole) in 25 ml. of methylene chloride was added. After 4 h. at room temperature the reaction mixture was treated with ether. The precipitated oil was twice redissolved in methylene chloride and reprecipitated with ether, then it was taken up in methanol and treated with 5 ml. of a 2.4 M solution of potassium 2-ethylhexanoate in n-butyl alcohol. The potassium cephalosporanate precipitated upon addition of ether. It was redissolved in methanol followed by reprecipitation with ether to give 5.0 g. (82%) of yellow, solid potassium 7-{[p-(tert.-butoxycarbonylaminomethyl)phenylthio]acetamindo}cephalosporanate, the infrared spectrum (Nujol mull) of which showed maxima at 3250, 1755, 1690, 1650 and 1600 cm.$^{-1}$.

METHOD 3

This example describes a somewhat simplified procedure for the preparation of (p-aminomethylphenylthio) acetic acid, involving a hydrolysis without isolation of the condensation product from N-methylolchloroacetamide and (phenylthio)acetic acid.

(p-Tert. - butoxycarbonylaminomethylphenylthio)acetic acid can be prepared in quantitative yield from tert.-butoxycarbonyl azide and the amino acid by using triethylamines as the base.

The BOC-amino acid reacts with thionyl chloride in the presence of triethylamine (methylene chloride as solvent) or pyridine (benzene as solvent) to give the BOC-amino acyl chloride, which can be directly coupled with 7-ACA in methylene chloride solution in the presence of triethylamine.

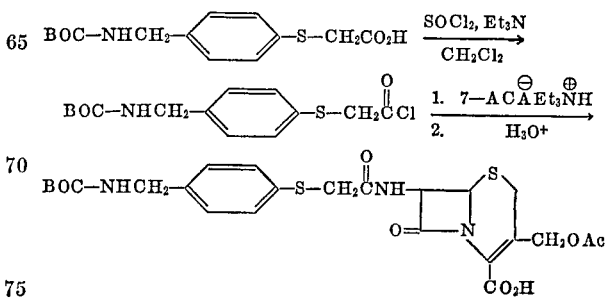

(p-Aminomethylphenylthio)acetic acid

A mixture of (phenylthio)acetic acid (140.8 g., 0.84 mole) and N-methylolchloroacetamide (103.7 g., 0.84 mole) was added in portions in one h. with stirring to 200 ml. of concentrated sulfuric acid at 10–20°. The reaction mixture was left at room temperature for two days and was then divided into two equal portions. One portion was worked up immediately and the other was left at room temperature for an additional two days prior to work-up. The mixtures were worked up as follows: Water (180 ml.) was added with stirring and the solution heated under reflux for 1.5 h., followed by cooling in an ice-salt mixture for 30 minutes. The white solid precipitate was collected by filtration and washed with a small volume (60 ml.) of ice-water. It was dissolved, by heating, in 400 ml. of water, and the pH of this solution was adjusted to 5.0 with concentrated ammonium hydroxide. The solution was cooled overnight at 0° and the precipitate collected by filtration. The white solid was washed with ice-water and methanol, and amounted to 17.6 g. The second portion of the reaction mixture was worked up in the same manner and yielded the same amount of product. Total yield: 34.9 g. (21%), M.P. 250–252° (decomp.).

(p-Tert.-butoxycarbonylaminomethylphenylthio)acetic acid

To a stirred and ice-cooled solution of (p-aminomethylphenylthio)acetic acid (7.9 g., 0.040 mole) and triethylamine (10.0 g., 0.10 mole) in 100 ml. of water was added, in one portion, a solution of tert.-butoxycarbonyl azide (7.2 g., 0.050 mole) in 75 ml. of tetrahydrofuran. The mixture was stirred at room temperature for 16 hours. Most of the tetrahydrofuran was removed under reduced pressure. The aqueous solution was washed with ether, then layered with 125 ml. of ether and under stirring and cooling the solution was acidified to pH 2.5 with dilute hydrochloric acid. The layers were separated and the aqueous layer was extracted with an additional 150 ml. of ether. The combined ether solutions were dried (MgSO$_4$) and concentrated to dryness, giving 11.5 g. (97%) of white solid residue, M.P. 112–114°, sufficiently pure for the next step.

7-[(p-tert.-butoxycarbonylaminomethylphenylthio)acetamido]cephalosporanic acid

A solution of thionyl chloride (3.00 g., 0.025 mole) in 25 ml. of methylene chloride was added dropwise in 15 min. to a stirred and ice-cooled solution of (p-tert.-butoxycarbonylaminomethylphenylthio)acetic acid (7.43 g., 0.025 mole) and triethylamine (2.73 g., 0.027 mole) in 50 ml. of methylene chloride. When the addition was completed the mixture was left at 0° for an additional 30 min. and was then added dropwise in 10 min. to a stirred solution of 7-aminocephalosporanic acid (6.80 g., 0.025 mole) and triethylamine (5.05 g., 0.050 mole) in 50 ml. of methylene chloride cooled at −20 to −30°. The reaction mixture was allowed to warm up gradually in one hour and was then treated with 75 ml. of water. With stirring and ice-cooling 25 ml. of 1 N hydrochloric acid was added. The layers were separated and the aqueous layer was extracted with an additional 25 ml. of methylene chloride. The combined methylene chloride solutions were dried (MgSO$_4$) and concentrated to dryness. The yellow colored residual foam weighed 13.0 g.

DESCRIPTION OF THE PREFERRED EMBODIMENT

EXAMPLE

7 - [p-tert.-butoxycarbonylaminomethyl)phenylthio]acetamido-3-(picolinoylthiomethyl)ceph-3-em-4-carboxylic acid Potassium 7 - [[p - (tert.-butoxycarbonylaminomethyl) phenylthio]acetamido]cephalosporanate (5.9 g., 0.010 mole) was added in portions with stirring to a solution of thiopicolinic acid (2.8 g., 0.020 mole) in 60 ml. of water, maintained at 75°. The reaction mixture was kept at 75° for 1 h. and was then cooled and the brown solid filtered off. A solution of this material in a mixture of acetone (100 ml.) and water (30 ml.) was adjusted to pH 2.0 with concentrated hydrochloric acid and diluted with 250 ml. of water. The resulting sticky solid precipitate, after washing with water and ether, was dissolved in methylene chloride. This solution was dried (MgSO$_4$) and the solvent removed, giving 3.4 g. (54%) of the crude product as a pale brown solid. The infrared spectrum (Nujol mull) contained bands at 1775, 1700 and 1660 cm.$^{-1}$.

7 - [p-(tert.-butoxycarbonylaminomethyl)phenylthio]acetamido-3-(pyridiniummethyl)ceph-3-em-4-carboxylate A solution of the picolinoylthiomethyl cephalosporin (4.3 g., 0.0068 mole), prepared above, in 30 ml. of pyridine was diluted with 30 ml. of water. A solution of the mercuric perchlorate-pyridine complex (9.5 g., 0.0171 mole) in a mixture of 30 ml. of pyridine and 30 ml. of water was added in approximately 5 min. at room temperature. The reaction mixture was stirred at room temperature for 1 h. then hydrogen sulfide was passed through for 5 min. The mixture was filtered through "Celite" and the filtrate successively washed with benzene (100 ml.), a 1:2 mixture of "Amberlite LA–1" resin and benzene (150 ml. and 75 ml. portions) and benzene (75 ml.). The aqueous solution was concentrated to dryness under reduced pressure, giving 1.9 g. (49%) of brown residue. The infrared spectrum (Nujol mull) showed strong absorption at 1770 and 1660–1700 cm.$^{1}$.

7 - (p-aminomethylphenylthio)acetamido-3-(pyridiniummethyl)ceph-3-em-4-carboxylate The BOC-protected cephalosporin (2.2 g., 0.0039 mole) was added in portions with stirring to 15 ml. of trifluoroacetic acid at 0°. The reaction mixture was left at 0° for 2 h., followed by the addition of ether. The pale yellow solid (1.7 g.) was collected by filtration, washed with ether and dissolved in 30 ml. of water. After a small amount of insoluble material had been removed by filtration, the pH of the solution was adjusted to 7.2 with dilute ammonium hydroxide. The mixture was treated with decolorizing carbon and filtered through "Celite" then concentrated to dryness under reduced pressure. The solid residue was extracted with methanol (two 20 ml. portions and one 10 ml. portion). A small amount of insoluble material was removed by filtration. The combined methanol solutions were treated with 75 ml. of ether. The pale brown solid precipitate was washed with methylene chloride (2× 20 ml.) and ether and dried in vacuo over P$_2$O$_5$; it amounted to 0.73 g. (41%). The infrared spectrum (Nujol mull) contained the expected absorption bands at 1775, 1675 and 1610 cm.$^{-1}$ ascribed to the β-lactam, amide carbonyl and carboxylate respectively. The n.m.r. spectrum also was in agreement with the proposed structure. A thin-layer chromatogram revealed only one component and on the basis of this and the spectral data the material was assigned a minimum purity of 85%.

"Amberlite LA–1" resin is a mixture of secondary amines wherein each secondary amine has the formula

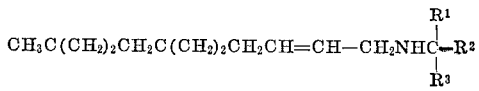

wherein each of R$^1$, R$^2$ and R$^3$ is an aliphatic hydrocarbon radical and wherein R$^1$, R$^2$ and R$^3$ contain in the aggregate from 11 to 14 carbon atoms; this particular mixture of secondary amines, which is sometimes referred to as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—74%, above 220° C.—17%.

We claim:
1. The compound of the formula
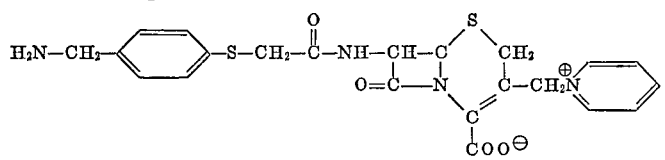
or a nontoxic, pharmaceutically acceptable acid addition salt thereof.
2. The compound of the formula
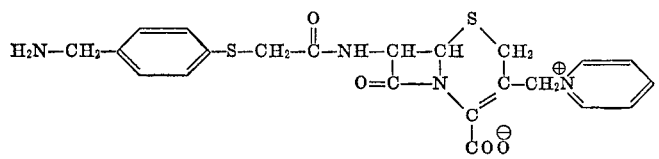
3. The hydrochloride of the compound of claim 2.
4. A nontoxic, pharmaceutically acceptable acid addition salt of the compound of claim 2.
References Cited
UNITED STATES PATENTS
3,422,100   1/1969   Crast _____ 260—243 C
NICHOLAS S. RIZZO, Primary Examiner
U.S. Cl. X.R.
424—246